235-410 SR
OR 2,634,909
SEARCH ROOM

April 14, 1953 J. LEHMANN 2,634,909

COMPUTING DEVICE

Filed March 31, 1950

INVENTOR
Jules Lehmann
BY Morris A. Rabkin
ATTORNEY

Patented Apr. 14, 1953 2,634,909

UNITED STATES PATENT OFFICE 2,634,909

COMPUTING DEVICE

Jules Lehmann, Trenton, N. J., assignor to Radio Corporation of America, a corporation of Delaware Application March 31, 1950, Serial No. 153,148

7 Claims. (Cl. 235—61.5)

This invention relates to electronic computers. More particularly, this invention is an improved electronic system for converting voltages representative of rectangular coordinates into voltages representative of equivalent polar coordinates.

In computing systems and artillery predicting systems, it is oftentimes necessary to convert voltages, which are representative of rectangular coordinates into voltages representative of equivalent polar coordinates. For the performance of this conversion apparatus such as non-linear wound potentiometers or A. C. resolvers are used. The cost of these types of potentiometers and A. C. resolvers is high, their manufacture requires care and precision workmanship. These coordinate converting systems also require some type of mechanical drive or linkage in order to be operative.

It is an object of the present invention to provide a completely electronic coordinate converting system.

It is a further object of the present invention to provide a coordinate converting system which eliminates mechanical linkages.

It is a still further object of the present invention to provide a coordinate converting system which is less expensive than those known heretofore.

Another object of the present invention is to provide a coordinate converting system which is simpler to manufacture than those known heretofore.

These and other objects are achieved, in accordance with the present invention by multiplying voltages representative of the abscissa and the negative of the ordinate in rectangular coordinates by two outputs from a circuit loop. Both products are then combined and applied to a high gain amplifier. A portion of the output of the amplifier is integrated to provide a voltage proportional to $\alpha$, the polar coordinate angle. Another portion of the amplifier output is applied to the circuit loop at two points. At one of those points, the amplifier output voltage is multiplied by the output of a phase reversing amplifier. This product voltage is integrated to provide a voltage proportional in value to $\cos \alpha$. This $\cos \alpha$ voltage is used as one of the loop outputs to multiply the negative of the ordinate voltage and is also used to multiply the voltage applied to the loop at the second of the two points. This latter product voltage is then integrated. The integrated voltage is then applied to the phase reversing amplifier the output from which is the second circuit loop output voltage proportional to the sine $\alpha$ which is used to multiply the voltage representative of the abscissa.

The novel features of the present invention, as well as the invention itself, both as to its organization and method of operation, will best be understood from the following description, when read in connection with the accompanying drawings, in which, Figure 1 is a drawing showing some basic rectangular and polar coordinate relationships;

Figure 1:
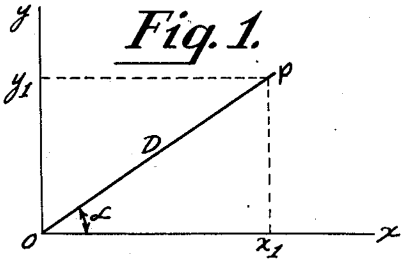

Referring now to Figure 1, assuming an abscissa $x_1$ and an ordinate $y_1$, their intersection meets at a point P. The line D drawn through the point of origin and the point P makes an angle $\alpha$ with the abscissa. From Figure 1, the following relationships may be deduced:

$$D=x_1 \cos \alpha+y_1 \sin \alpha$$
$$x_1 \sin \alpha-y_1 \cos \alpha=0$$

Figure 2:
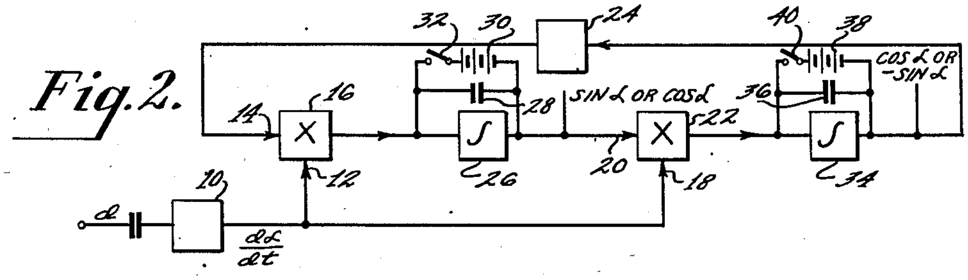
Figure 2 is a schematic diagram of a novel circuit loop for generating trigonometric functions which finds application in the invention.

Referring to Fig. 2, a voltage proportional to an angle $\alpha$ is applied to a differentiating amplifier 10. The output of the differentiating amplifier 10 is then a voltage proportional to $$\frac{d\alpha}{dt}$$

and it is applied to one input 12 of a first multiplying amplifier 16 and to one input 18 of a second multiplying amplifier 22. A phase reversing amplifier 24 has its output connected to a second input 14 of the first multiplier 16 or multiplying amplifier. The first multiplying amplifier output is a product voltage which is applied to the input of a first integrating amplifier 26 or integrator. The first integrating amplifier output is connected to a second input 20 of the second multiplying amplifier 22. The second multiplying amplifier output is connected to the input of a second integrating amplifier 34. The output of the second integrating amplifier 34 is connected to the input of the phase reversing amplifier 24 thus completing the circuit loop.

If it is assumed that the output of the phase reversing amplifier 24, which is applied to the input 14 of the first multiplier 16, is a voltage proportional to $$\frac{d^2y}{d\alpha^2}$$

then the output of the first multiplier is a voltage proportional to the product $$\frac{d^2y}{d\alpha^2}\cdot\frac{d\alpha}{dt}$$

This product voltage is applied to the first integrator the output from which is then $$-\frac{dy}{d\alpha}$$

This is multiplied by the input voltage proportional to $$\frac{d\alpha}{dt}$$

The second multiplier output is then a voltage proportional to $$-\frac{dy}{d\alpha}\cdot\frac{d\alpha}{dt}$$

This is applied to the input of the second integrator. Its output accordingly is $+y$. The output of the phase inverting amplifier therefore is a voltage proportional to $-y$.

The loop equation, in view of the above, is, $$-y=\frac{d^2y}{d\alpha^2}$$

The solution for this equation is $$y=c_1 \cos \alpha+c_2 \sin \alpha$$

The value of the constants $c_1$ and $c_2$ are determined by initial conditions, and in the case of the circuit loop, shown in Figure 2, these initial conditions are determined by the initial charges applied to the feedback condensers 28, 36 of the first and second integrators. The first integrating amplifier feedback condenser is paralleled by a battery 30 and switch 32 and the second integrating amplifier feedback condenser 36 is paralleled by a battery 38 and a switch 40. To fix the values of the constants the loop is set up to provide the values of sine $\alpha$ and cos $\alpha$ when $\alpha=0$, at the beginning of a problem. The switch 40, which connects the battery 38 across the second integrator feedback condenser 36, is closed, thus allowing the battery 38 to charge the feedback condenser 36 up to a voltage value which is taken as unity. The switch 40 is then opened. The values of the constants then are, $c_1=1$, $c_2=0$. This therefore provides $$y=\cos \alpha$$

If, instead of charging the feedback condenser 36 of the second integrator 34 to unity voltage, the feedback condenser 28 of the first integrator 26 is charged to unity voltage by the switch 32 and battery 30 connected in parallel therewith, the value of the constants are $c_1=0$, $c_2=-1$. In that case, $y=-\sin \alpha$. It is thus seen that the output of the second integrator 34 may be made to equal the sine or cosine of $\alpha$ as determined by which of the feedback condensers of the integrators 26, 34 receives a preliminary charge.

The output from the integrator 26 is then cated above is $$-\frac{dy}{d\alpha}$$

For the condition where $y=\cos \alpha$, $$-\frac{dy}{d\alpha}=+\sin \alpha$$

Accordingly, the output of the first integrator 26 is sin $\alpha$. For the situation where the first integrator feedback condenser 28 is initially charged, as shown above, $y=-\sin \alpha$ and $$\frac{-dy}{d\alpha}=\cos \alpha$$

The output from the integrator 26 is then a voltage proportional to cos $\alpha$ while the output from the phase reversing amplifier 24 is proportional to sin $\alpha$. The operation of an integrator such as is used herein may be found described in an article by John R. Ragazzini, Robert H. Randall and Frederick A. Russell, entitled "Analysis of Problems in Dynamics by Electronic Circuits" in the Proceedings of the I. R. E., for May 1947, pp. 444 through 452. Another description is found on page 78, Sec. 4.7 of "Electronic Instruments" by Greenwood, Holdam and MacRae (McGraw Hill Book Company, Inc., 1948), volume 21 of the Radiation Laboratory Series of M. I. T.

An integrating amplifier provides, in view of the condenser used therewith, a storage action whereby the last value which was applied to the input to the integrator (after a lapse of time to permit the integrating action), will be maintained at the output. Therefore, if, in the network shown in Figure 2, after its application $$\frac{d\alpha}{dt}$$

were removed, the network would still continue for a time to provide an output proportional to the sine and cosine of $\alpha$ until the charge on condensers 28 and 36 would leak off. Upon the next application of $$\frac{d\alpha}{dt}$$

the sine and cosine terms would change to a value sin $\alpha_1$ and cos $\alpha_1$.

Figure 3:
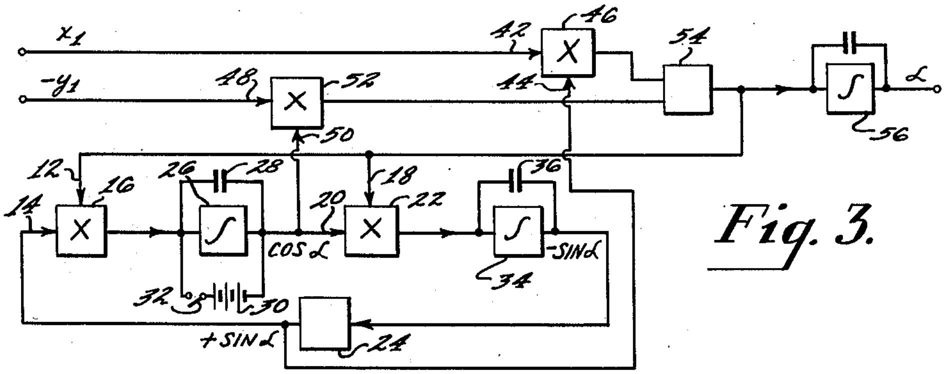
Figure 3 is a schematic diagram of an embodiment of the present invention.

Figure 3 is a schematic diagram of an embodiment of the invention which is used for solving the equation $x_1 \sin \alpha-y_1 \cos \alpha=0$.

A voltage proportional to a rectangular coordinate abscissa, $x_1$, is applied to one input 42 of a first input multiplier 46. A voltage proportional to the negative of the rectangular coordinate ordinate, $-y_1$, is applied to one input 48 of a second input multiplier 52. The second inputs 44, 50 of the first and second input multipliers are connected to two points in a circuit loop. This circuit loop is identical to the one shown and described in Fig. 2. The similar functioning parts of the loop are similarly identified. As shown, the battery 30 and switch 32 are arranged to apply a preliminary charge to the feedback condenser 28 of the first integrator 26 for the condition when $\alpha$ equals zero. Therefore the output of the first integrator 26 is a voltage proportional to cos $\alpha$ and the output of the phase reversing amplifier 24 is a voltage proportional to sin $\alpha$.

The second inputs 44, 50 of the first and second input multipliers 46, 52 are respectively coupled to the outputs of the phase reversing amplifier 24 and the first integrator 26 of the loop, as shown. The outputs of the first and second input multipliers 46, 52 are combined and fed to a high gain summing amplifier 54. The high gain summing amplifier output is fed to an output integrator 56 and to one of the inputs 12, 18 of the first and second multipliers 16, 22 of the circuit loop.

The system shown in Fig. 3 operates in the same manner as an integrating servo system. Assuming that the system is initially balanced (the outputs from the first and second input multipliers 46, 52 substantially cancel each other), a change in either of the voltages $x_1$ or $-y_1$ causes a voltage to appear at the output of the high gain amplifier 54. This voltage is applied to the first and second multipliers 16, 22 of the circuit loop and causes changes in the two output voltages therefrom. These two loop output voltages change until the system is balanced again. Since, for this condition, $$x_1 \cdot \sin \alpha - y_1 \cos \alpha = 0,$$

the two output voltages from the circuit loop, which multiply the voltages proportional to the abscissa and the ordinate, are respectively proportional to sin $\alpha$ and cos $\alpha$.

As has been shown and explained for Figure 2, the voltage input to the circuit loop must be proportional to the time derivative of the angle, or $$\frac{d\alpha}{dt}$$

in order that the output of the circuit loop be voltages proportional to sine $\alpha$ and cosine $\alpha$. Since the input to the circuit loop in Figure 3 is the output of the high gain amplifier 54, this output accordingly is a voltage proportional to $$\frac{d\alpha}{dt}$$

This $$\frac{d\alpha}{dt}$$

voltage is applied to the output integrator 56 whose output accordingly is a voltage proportional to or representative of the angle $\alpha$. The system shown in Figure 3 therefore provides voltages proportional in value to the angle $\alpha$, the sine $\alpha$ and the cosine $\alpha$. It should be noted that when $x_1$ and $-y_1$ are not changing in value but are static, $$\frac{d\alpha}{dt} = 0$$

However, in view of the inherent storage action of the condenser of the integrators 26, 34 and 56, a voltage representative of the last value of $\alpha$ still will appear at the output of integrator 56, and values representative of the last values of cos $\alpha$ and sin $\alpha$ still will appear at the respective outputs of integrator 26 and amplifier 25.

Another and possibly simpler explanation of the operation of the circuit as shown in Fig. 3 is as follows: When $x_1$ and $y_1$ are zero, the entire circuit provides an output which is zero. Now, assume a value applied to $x_1$. Assume also that a charge has been applied on condenser 28 which is the feedback condenser of integrator 26. The output of the integrator for these input conditions provides cos $\alpha$ equals to 1. Since the 1 is applied to the multiplying amplifier 52, $y_1 = 0$, the output to amplifier 54 from the $y_1$ terminal will be 0. The output of integrator 26 is applied to multiplier 22. Since the output of amplifier 54 is zero, there will be no output from multiplier 22 and sin $\alpha$, which is the output of amplifier 24, is 0. Accordingly, amplifier 54 will have 0 output, and integrator 56 will provide a value for $\alpha$ equal to 0. Assume now a voltage being applied to the $-y_1$ terminal. As this voltage changes from 0 up to its value, this change appears in the output of multiplier 52, and, not being bucked out, also appears in the output of amplifier 54 and is applied to the loop circuit. Since, by the application of $-y_1$ the angle $\alpha$ is changed from zero to $\alpha$ at a rate $$\frac{d\alpha}{dt}$$

if, after $-y_1$ has attained its equilibrium value, the value of the sine $\alpha$ and cos $\alpha$ terms applied to the multipliers 46 and 52 are such as to provide a zero input and consequently zero output from amplifier 54, in view of the relationships of the loop circuit as described for Figure 2, the input to the loop circuit must have been $$\frac{d\alpha}{dt}$$

for this equilibrium to occur. At equilibrium, when the voltage applied to the $-y_1$ terminal has attained its steady state value, the output of amplifier 54 is substantially 0. This condition is reached as a result of the circuitry involved being arranged as an analogue for solving the equation $x_1 \sin \alpha - y_1 \cos \alpha = 0$. Since, as a result, it can be said that the voltage appearing at the output of amplifier 54 was $$\frac{d\alpha}{dt}$$

the output of integrator 56 is equal to $\alpha$. Now, bearing in mind the storage action of integrators, when $x_1$ and $-y_1$ are maintained at their steady state values, the output of the amplifier 54 is 0, and the output of integrator 26 is still maintained at cos $\alpha$ and the output of amplifier 24, which is merely the reversing amplifier for the output of integrator 34, is still maintained at the value sin $\alpha$. Finally, the output of integrator 56 is still maintained at the value $\alpha$. In order to remove these values, the condensers must be discharged. If a new value of $x_1$ or $-y_1$ or both is applied the circuit will function to alter the values of sin $\alpha$ and cos $\alpha$ responsive to an output from amplifier 54. It bears reiteration that an input $$\frac{d\alpha}{dt}$$

to the circuit loop does not have to be maintained after having been once applied in order to have an output from the loop. A subsequent application of $$\frac{d\alpha}{dt}$$

will change the loop output to correspond to the new value of $\alpha$. However, in the case of the circuit shown in Figure 3, $x_1$ and $-y_1$ must be maintained applied, in order to maintain the loop output at sine and cosine $\alpha$, since any removal of $x_1$ or $-y_1$ is the same as decreasing $\alpha$ and a $$\frac{-d\alpha}{dt}$$

is applied to the loop as a result.

Figure 4:
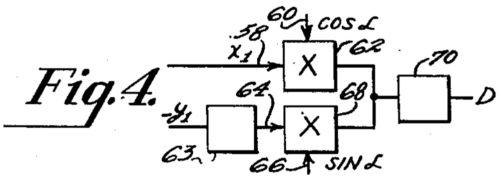
Figure 4 is a schematic diagram of an embodiment of another feature of the invention.

Figure 4 shows a system for obtaining a voltage proportional in value to D. Two multipliers 62, 68 are provided to the respective first inputs 58, 64 of which the abscissa voltage $x$ and the ordinate voltage $y$ are applied. A phase reversing amplifier 63 is shown connected between the source of negative ordinate voltages and the first input 64 of the second multiplier 68 to convert the negative ordinate voltage to a positive ordinate voltage. A voltage proportional to cos $\alpha$ is applied to the second input 60 of the abscissa multiplier 62 whereby its output is a voltage proportional to $x_1 \cos \alpha$. A voltage proportional to sin $\alpha$ is applied to the second input 66 of the ordinate multiplier 68 to provide an output voltage proportional to $y_1 \sin \alpha$. These outputs are then applied to a summing amplifier 70 whose output is a voltage proportional to D, the distance between the origin and the point defined by the coordinates $x_1$ and $y_1$. The cos $\alpha$ and sin $\alpha$ voltages may be obtained from the loop circuit output as shown in Fig. 3. The rectangular coordinate voltages are simultaneously obtained from the same rectangular coordinate source as applies voltage to the system shown in Fig. 3. Fig. 4 and Fig. 3 may readily be interconnected to simultaneously provide voltages proportional to D, $\alpha$, cos $\alpha$ and sin $\alpha$.

Figure 5:
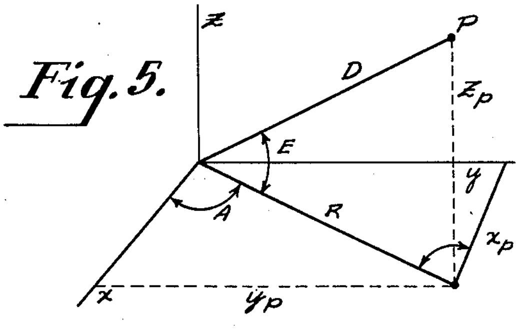
Figure 5 is a graph showing certain basic relations between the coordinates in a three dimensional system and polar coordinates.

Fig. 5 illustrates a three-dimensional system where, for the point P, the following relationships may be seen.

$$Z_p = D \sin E$$
$$R = D \cos E$$
$$Z_p \cos E - R \sin E = 0$$
$$X_p = R \cos A$$
$$Y_p = R \sin A$$
$$X_p \sin A - Y_p \cos A = 0$$

where $X_p$, $Y_p$ and $Z_p$ are respectively the ground and elevation coordinates of the point P,
$E$ is the angle of elevation,
$A$ is the azimuth angle,
$R$ is the ground range, and
$D$ is the slant range.

If, to one system, such as is shown in Fig. 3, voltages proportional to $Z_p$ and $-R$ are applied, in the same fashion as shown for voltages proportional to X and $-Y$, the system will provide voltages proportional to the angle E, cosine E and sine E. If to another system such as is shown in Fig. 3, voltages proportional to $X_p$ and $-Y_p$ are applied, in similar fashion to voltages X and $-Y$ presently shown in Fig. 3, the system will provide output voltages proportional to the angle A, sine A and cosine A.

From Fig. 5 the following relationships may be seen $$X_p \cos A + Y_p \sin A = R$$

and $$R \cos E + Z_p \sin E = D$$

Using the circuit shown in Fig. 4 and applying voltages proportional to $X_p$ and cosine A to the input of one multiplier and voltages proportional to $Y_p$ and sine A to the inputs of the other multiplier the output of the summing amplifier is a voltage proportional to R. Again, using a circuit such as is shown in Fig. 4 and applying voltages proportional to R and cosine E to one multiplier and $Z_p$ and sine E to the other multiplier the output of the summing amplifier is a voltage proportional to the slant range D. The output of the system providing the ground range R can provide the voltage proportional to $-R$ where required. This $-R$ value together with the altitude coordinate $Z_p$ are applied to a system, such as shown and described in Fig. 3, to obtain the elevation angle E.

Figure 6:
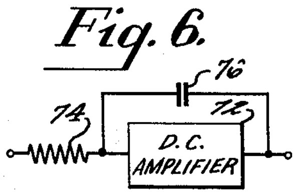
Figures 6, 7 and 8 are schematic diagrams of components used in the embodiment of the invention.
Figure 7:
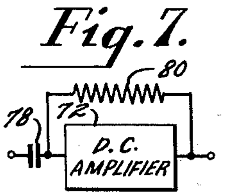
Figure 8:
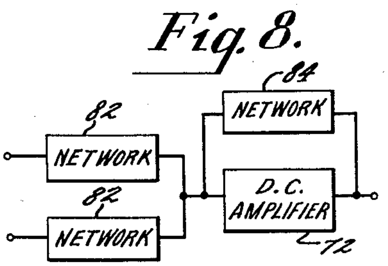

Figs. 6, 7 and 8 are schematic diagrams which are representative respectively of an integrator, a differentiator and a multiplier which are used in the circuits described in Figs. 2, 3 and 4. The integrator differentiator and multiplier all include a stable D. C. amplifier 72. Any well known stable D. C. amplifier may be used. The integrator shown in Fig. 6 includes an input resistor 74 connected to the amplifier input and a feedback condenser 76 coupling the amplifier output and input.

The differentiator shown in Fig. 7 consists of an input condenser 78, connected to the amplifier input and a feedback resistor 80 connecting the amplifier output and input. The multiplier shown in Fig. 8 includes two non-linear networks 82 having one of their ends connected to the amplifier input and the other of their ends serving as a first and a second input for the amplifier. Otherwise stated, there are multiplier and multiplicand inputs. A third non-linear network 84 is used to couple the amplifier output to the amplifier input. These non-linear networks are all similar and have characteristics such that their output currents are proportional to the logarithm of their input voltages. These non-linear networks are commercially available under the trade name "Logaten."

From the foregoing description it will be readily apparent that I have provided a completely electronic coordinate converting system. Although only a single embodiment of the present invention has been shown and described, it should be apparent that many changes may be made in the particular embodiment herein disclosed, and that many other embodiments are possible, all within the spirit and scope of my invention. Therefore I desire that the foregoing description shall be taken as illustrative and not as limiting.

What is claimed is:

1. A system for converting voltages representative of two coordinates in a rectangular coordinate system to voltages representative of equivalent polar coordinates comprising circuit loop means to generate voltages proportional to the sine and a cosine of a polar coordinate angle responsive to a voltage proportional to the time derivative of said equivalent polar coordinate angle, means to generate a voltage proportional to the time derivative of said equivalent polar coordinate angle responsive to said voltages representative of said two coordinates and said voltages proportional to the sine and cosine of said equivalent polar coordinate angle, said last-named means having an input coupled to the output of said first named means to derive said sine and cosine voltages therefrom and having its output coupled to said first-named means input to apply said voltage proportional to the time derivative of said equivalent polar coordinate angle thereto, and means to impress said two coordinate voltages upon said means to generate a voltage proportional to the time derivative of said equivalent polar coordinate angle.

2. A system for converting voltages representative of an abscissa and an ordinate in a rectangular coordinate system to voltages representative of equivalent polar coordinates comprising circuit loop means to generate voltages proportional to the sine and cosine of a polar coordinate angle equivalent to said ordinate and abscissa coordinates responsive to a voltage proportional to the time derivative of said equivalent polar coordinate angle, means coupled to said circuit loop means to multiply said voltage proportional to said abscissa by said voltage proportional to the sine of said equivalent polar coordinate angle to provide a first product voltage, means coupled to said circuit loop means to multiply a voltage proportional to the negative of said ordinate voltage by said voltage proportional to the cosine of said equivalent polar coordinate angle to provide a second product voltage, and means to combine said first and second product voltages connected to both said multiplying means outputs, said means to combine having its output connected to said circuit loop means to impress said combined product voltages thereon, said combined product voltages being a voltage proportional to the time derivative of said equivalent polar coordinate angle.

3. A system as recited in claim 2 having in addition integrating means coupled to the output of said means to combine to provide an output voltage proportional to said equivalent polar coordinate angle.

4. A system for converting voltages representative of an abscissa and an ordinate in a rectangular coordinate system to voltages representative of equivalent polar coordinates comprising circuit loop means to generate voltages proportional to the sine and cosine of a polar coordinate angle equivalent to said ordinate and abscissa coordinates responsive to a voltage proportional to the time derivative of said equivalent polar coordinate angle, means coupled to said circuit loop means to multiply said voltage proportional to said abscissa by said voltage proportional to the sine of said equivalent polar coordinate angle to provide a first product voltage, means coupled to said circuit loop means to multiply a voltage proportional to the negative of said ordinate voltage by said voltage proportional to the cosine of said equivalent polar coordinate angle to provide a second product voltage, means to combine said first and second product voltages connected to both said multiplying means, said means to combine having its output connected to said circuit loop means to impress said combined product voltages thereon, said combined product voltages being a voltage proportional to the time derivative of said equivalent polar coordinate angle, means to multiply said voltage proportional to said abscissa with said voltage proportional to the cosine of said equivalent polar coordinate angle, means to multiply said voltage proportional to said ordinate with said voltage proportional to the sine of said equivalent polar coordinate angle, both said last named means to multiply being connected to said circuit loop means to derive said sine and cosine voltages therefrom, means to impress said ordinate and abscissa voltages respectively on said last named means to multiply, and means to combine the outputs from both said means to multiply to provide a voltage proportional to the distance between the point of origin of said rectangular coordinates and the point defined by said abscissa and said ordinate.

5. A system for converting voltages representative of an abscissa and an ordinate in a rectangular coordinate system to voltages representative of equivalent polar coordinates comprising a circuit loop having a first multiplying means having two inputs, a first integrating means having its input connected to said first multiplying means output, a second multiplying means having two inputs one of which is connected to said first integrating means output, a second integrating means having its input connected to said second multiplying means output, a phase reversing amplifier having its input connected to said second integrating means output and its output connected to one of said first multiplying means inputs, means to generate a voltage proportional to the time derivative of the polar coordinate angle equivalent to said abscissa and ordinate coupled to said first and second multiplying means other inputs to apply said voltage thereto, means to impress said voltage proportional to said abscissa and a voltage equal to the negative of said voltage proportional to said ordinate upon said last-named means, and means to apply a preliminary charge to one of said integrating means whereby said first and second integrating means output voltages are respectively representative of the cosine and sine of said equivalent polar coordinate angle when said preliminary charge is applied to said first integrating means and said first and second integrating means output voltages are respectively representative of the sine and cosine of said equivalent polar coordinate angle when said preliminary charge is applied to said second integrating means.

6. A system for converting voltages representative of an abscissa and an ordinate in a rectangular coordinate system to voltages representative of equivalent polar coordinates, as recited in claim 5 wherein said means to generate a voltage proportional to the time derivative of the polar coordinate angle equivalent to said abscissa and ordinate comprises first and second input multiplying means having two inputs, said abscissa voltage being applied to one of said first input multiplying means inputs, the other of said first multiplying means inputs being coupled to said circuit loop to derive said voltage proportional to the sine of said equivalent polar coordinate angle therefrom, the negative of said ordinate voltage being applied to one of said second input multiplying means inputs, the other of said first multiplying means inputs being coupled to said circuit loop to derive said voltage proportional to the cosine of said equivalent polar coordinate angle therefrom, and a high gain summing amplifier having its input coupled to said first and second multiplier means outputs and its output coupled to said other inputs of said first and second multiplying means whereby said summing amplifier output is a voltage proportional to the time derivative of the equivalent polar coordinate angle.

7. A system for converting voltages representative of an abscissa and an ordinate in rectangular coordinates to voltages representative of equivalent polar coordinates comprising first and second input multiplying means each having a pair of inputs and an output, means to impress a voltage representative of an abscissa on one of said first input multiplying means inputs, means to impress a voltage representative of the negative of an ordinate on one of said second input multiplying means inputs, a high gain summing amplifier having an input and an output, said first and second multiplying means outputs being connected to be applied to said high gain amplifier input, an output integrating means having an input and an output, said output integrating means input being connected to said amplifier output, first and second loop multiplying means each having a pair of inputs and an output, said high gain amplifier output being also coupled to one input of each of said pairs of inputs of said first and second loop multiplying means, a first integrating means having an input connected to said first loop multiplying means output and an output coupled to the other of said second input multiplying means pair of inputs and to the other of said second loop multiplying means pair of inputs, a second integrating means having an input connected to said second loop multiplying means output, a phase inverting amplifier having an input connected to said second integrating means output and an output connected to the other of said first loop multiplying means inputs and to the other of said first input multiplying means inputs, and means to apply a preliminary charge to said first integrating means whereby said output integrating means output is a voltage representative of the polar coordinate angle, the output of said first integrating means is a voltage representative of the cosine of said angle and the output of said phase reversing amplifier is a voltage representative of the sine of said angle.

JULES LEHMANN.

References Cited in the file of this patent

UNITED STATES PATENTS

| Number | Name | Date |
|---|---|---|
| 2,442,597 | Greenough | June 1, 1948 |
| 2,510,384 | Dehmel | June 6, 1950 |
| 2,525,496 | McCann | Oct. 10, 1950 |

Certificate of Correction

Patent No. 2,634,909 April 14, 1953

Jules Lehmann

It is hereby certified that error appears in the printed specification of the above numbered patent requiring correction as follows:

Column 3, lines 72 and 73, for "The output from the integrator 26 is then cated above is" read *The output of the first integrator 26 as indicated above is*; column 5, line 45, after "provides" insert *output*;

and that the said Letters Patent should be read as corrected above, so that the same may conform to the record of the case in the Patent Office.

Signed and sealed this 6th day of April, A. D. 1954.

[SEAL]

ARTHUR W. CROCKER,
*Assistant Commissioner of Patents.*